ELECTRONIC ACCUMULATOR

Filed Jan. 7, 1950 4 Sheets-Sheet 1

INVENTOR
CARL F. RENCH

BY

HIS ATTORNEYS

April 1, 1952 C. F. RENCH 2,591,008

ELECTRONIC ACCUMULATOR

Filed Jan. 7, 1950 4 Sheets-Sheet 2

INVENTOR
CARL F. RENCH

BY Carl Beust
Louis A. Kline
HIS ATTORNEYS

April 1, 1952 C. F. RENCH 2,591,008

ELECTRONIC ACCUMULATOR

Filed Jan. 7, 1950 4 Sheets-Sheet 3

INVENTOR
CARL F. RENCH
BY Carl Beust
Louis A. Kline
HIS ATTORNEYS

April 1, 1952 C. F. RENCH 2,591,008

ELECTRONIC ACCUMULATOR

Filed Jan. 7, 1950 4 Sheets-Sheet 4

INVENTOR
CARL F. RENCH
BY Carl Beust
Louis A. Kline
HIS ATTORNEYS

Patented Apr. 1, 1952 2,591,008

UNITED STATES PATENT OFFICE 2,591,008

ELECTRONIC ACCUMULATOR

Carl F. Rench, Troy, Ohio, assignor to The National Cash Register Company, Dayton, Ohio, a corporation of Maryland Application January 7, 1950, Serial No. 137,311

7 Claims. (Cl. 235—61)

This invention relates to an improved electronic digital accumulator and novel controls therefor.

In particular, the accumulator of this invention includes, in each denominational order, four sets of electronic devices connected as trigger pairs and in cascade and also connected by novel simplified controls which enable the trigger pairs to be operated combinationally to accumulate values in the decimal notation. These simplified controls require a minimum of circuit components other than those used in the trigged connections and the cascade connections of the trigger pairs and consequently enable a smaller, more compact accumulator to be obtained. The novel controls also include those by which a normally operable tens-transfer-effecting means for operating the several tens transfer means in the accumulator is disabled during digit entries in the accumulator.

The simplified controls consist of direct-current circuits from the fourth trigger pair of the cascade to the second and third trigger pairs of the cascade whereby the fourth trigger pair, by its operation, can control the bias supplied to one of the electronic devices of the second and third trigger pairs to cause these pairs to make an additional operation when required. A control from the first trigger pair to the fourth trigger pair also controls the operation of the fourth trigger pair to enable the direct-current circuits to be used without interfering with the cascade operation of the trigger pairs.

In the novel control of the transfer means of the accumulator, a transfer-effecting impulse generating means in the impulse generator continuously supplies impulses to the transfer means of the accumulator to operate any transfer means, which has been conditioned by its related denomination, to cause a transfer entry to be made in the next higher order. In order to prevent transfer entries from being made in the accumulator at the same time that digit entries are being made therein, a control is provided in the impulse generator to disable the transfer-effecting impulse generating means when digit-representing impulse trains are being generated. This disabling of the transfer-effecting impulse-generating means causes any required transfers to be stored in the conditioned transfer means until the end of a digit entry into the accumulator.

It is an object of the invention to provide an improved electronic digital accumulator of the combinational type which uses direct-current feed-back circuits and related controls to enable accumulation in the decimal notation to be accomplished using four trigger pairs.

A further object of the invention is to provide a decimal accumulator, of the type which uses four trigger pairs in cascade, with novel controls which require a minimum of circuit components other than those necessary for the trigger connections and cascade connections.

A further object of the invention is to provide a decimal accumulator, of the type which uses four trigger pairs in cascade in each denominational order, with novel controls which vary the bias on certain trigger pairs to cause additional operations thereof as required in combinationally representing certain digits of the decimal notation.

A further object of the invention is to provide novel controls for the tens transfer means for the accumulator to disable tens transfer entries while digit entries are being made in the accumulator.

A further object of the invention is to provide means controlled by a digit entry effecting impulse generating means for disabling a normally operable transfer-effecting means during digit entry in an accumulator.

With these and other incidental objects in view, the invention includes certain novel features of construction and combinations of parts, a preferred form or embodiment of which is hereinafter described with reference to the drawings which accompany and form a part of this specification.

Of the drawings,

Figs. 1-A and 1-B together show a circuit diagram of an impulse generator containing a transfer-effecting impulse-generating means and the disabling controls therefor.

In order that the invention may be explained more fully, a preferred embodiment of the invention will be described, in which description values of potential and circuit elements, such as resistors and capacitors, will be given and types of tubes will be specified. It is not intended, however, to limit the invention to the embodiment described nor to limit the circuit values and tube types to those specified, because these are merely selected as illustrative. It is obvious that other potentials and/or other similar tube types can be used and the circuit values of resistance and capacitance can be adjusted to maintain the proper relation between the various parts of the circuits. Throughout the circuit diagrams, the heater elements for the tubes are shown conventionally.

*Impulse generator*

Figure 1A:
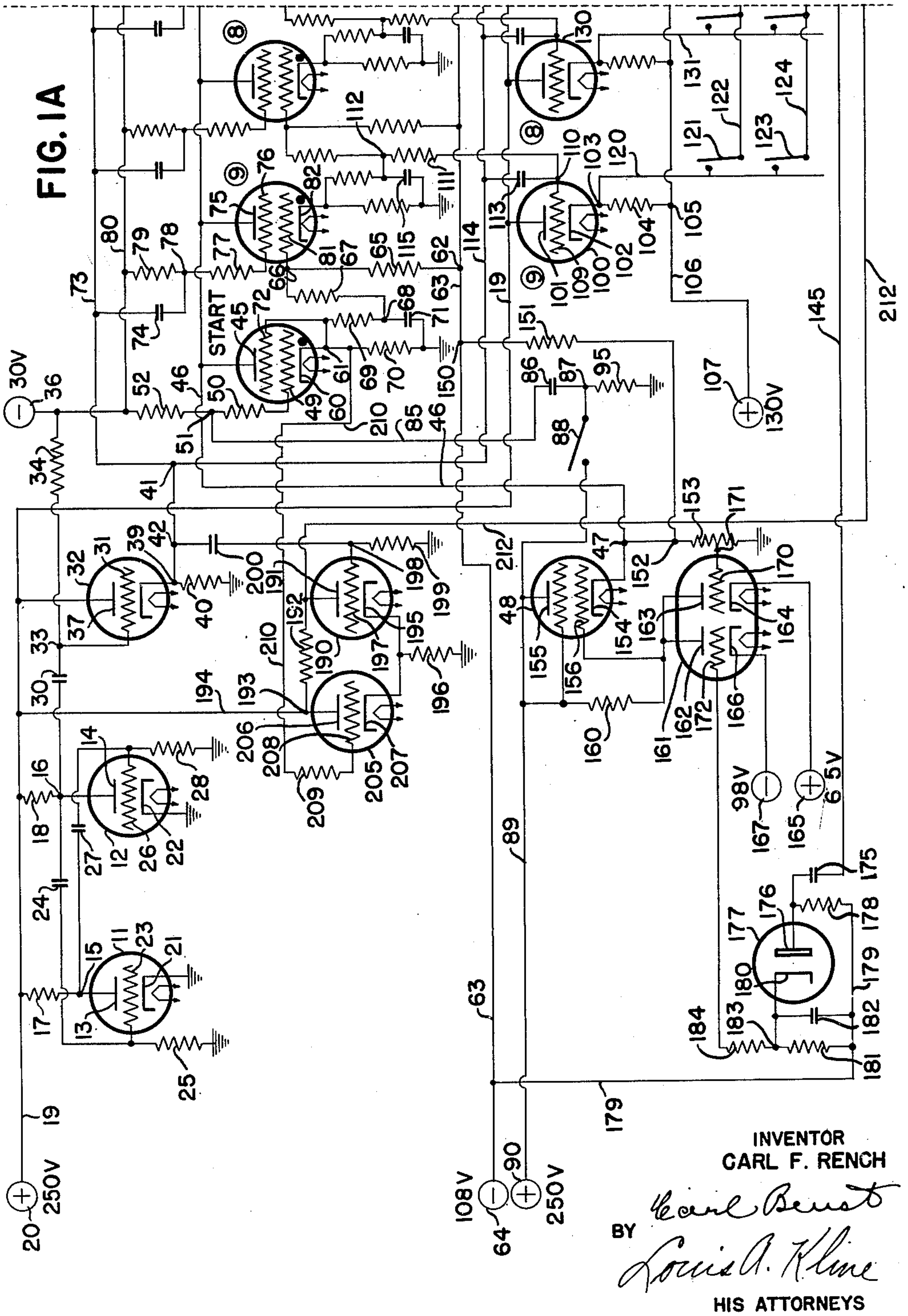
Figure 1B:
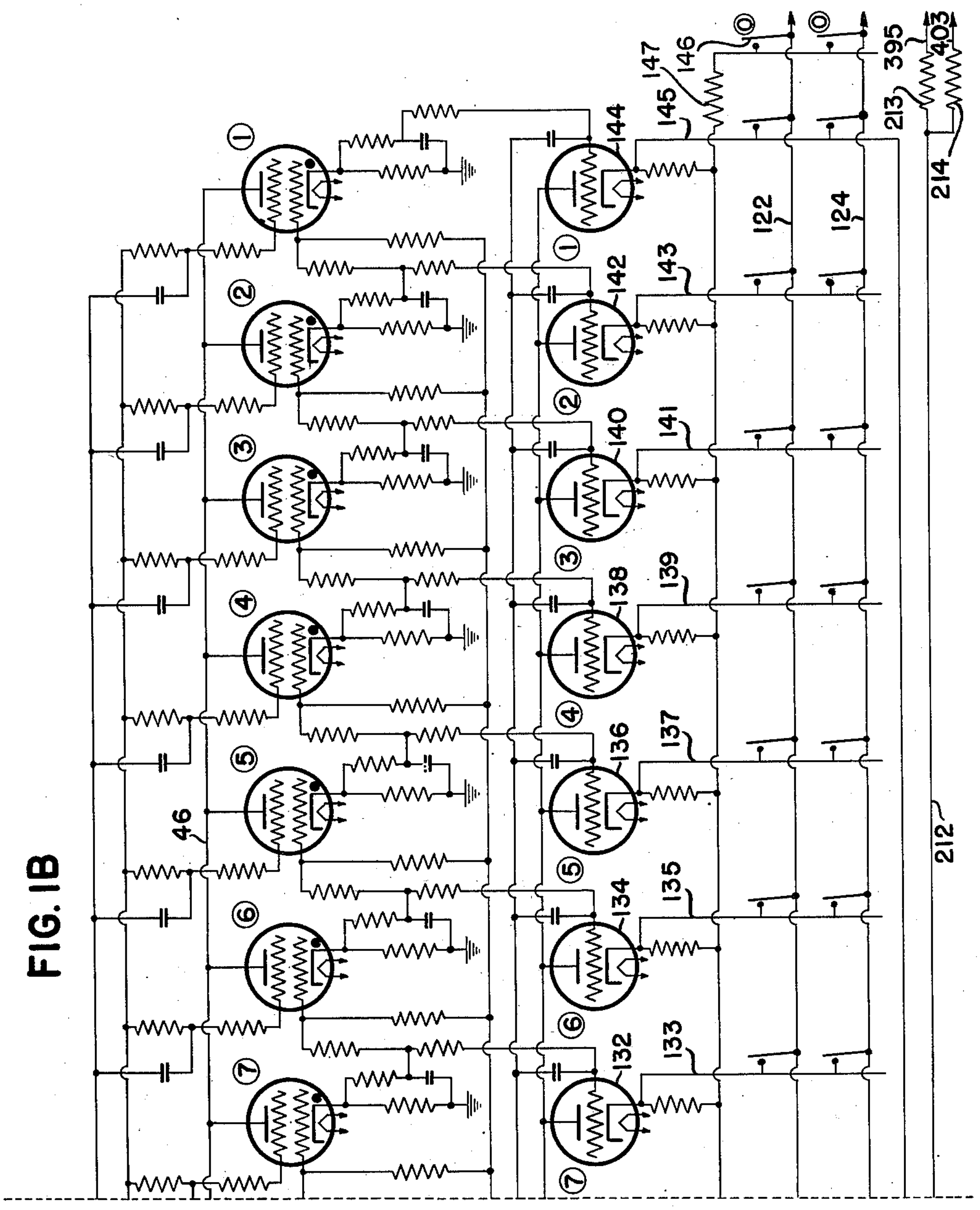

The impulse generator is capable of generating impulse trains containing different numbers of impulses corresponding to the digits of the notation in which computations are to be made, and is capable of sending the required number of impulses over one or more output conductors according to the digits desired to be entered into the various denominations of the accumulator. The impulse generator and its controls are shown in Figs. 1–A and 1–B.

A multi-vibrator type oscillator consisting of tubes 11 and 12 (Fig. 1–A) is provided to drive the impulse generator and to coordinate the operation of the tens transfer means of the accumulator with the digit entries. These tubes have their anodes 13 and 14 connected over points 15 and 16 and resistors 17 and 18, of 22,000 ohms each, to conductor 19, which extends to terminal 20, to which a potential of +250 volts is applied. The cathodes 21 and 22 of these tubes are grounded. The grid 23 of tube 11 is coupled over capacitor 24, of 50 micro-microfarads, to point 16 in the anode circuit of tube 12 and also is connected to ground over a 1-megohm resistor 25. Similarly, grid 26 of tube 12 is coupled over capacitor 27, of 50 micro-microfarads, to point 15 in the anode circuit of tube 11 and also is connected to ground over resistor 28 of 1 megohm. While tubes 11 and 12 are shown, and function, as two separate tubes, they need not be separate but can be the two sections of a single tube such as may be purchased from Radio Corporation of America under type designation 12AU7. With the values given, and using the 12AU7 type of tube, the oscillator will oscillate at about 7,000 cycles per second, and points as 15 and 16 will make a like number of positive potential excursions.

Point 16 is coupled over a capacitor 30 of 250 micro-microfarads to grid 31 of a driving impulse generating tube 32. Tube 32, which is shown as a separate tube but which preferably is half of a twin triode, such as a tube sold by Western Electric Company under the type designation 2C51, is normally biased to cut-off by having its grid 31 connected over point 33 and a resistor 34 of 150,000 ohms to terminal 36, to which −30 volts is applied, and is allowed to conduct momentarily each time the potential of point 16 becomes sufficiently positive in the operation of the oscillator to overcome the negative bias on the grid 31.

Tube 32 has its anode 37 directly connected to the conductor 19, to which +250 volts is applied, and has its cathode 38 connected to ground by a relatively low impedance circuit including point 39 and resistor 40 of 4,700 ohms.

With the values given, a positive potential impulse of about 150 volts will be produced at point 39 each time tube 32 conducts momentarily, and these impulses are used to cause the sequential operation of a chain of priming tubes, to drive the impulse-train-producing tubes, and to operate tubes which can produce transfer-effecting impulses.

The chain of priming tubes (Figs. 1–A and 1–B) utilizes gaseous tetrodes, such as tubes sold by General Electric Company under type designation GL5663, and includes a "start" tube and a priming tube for each of the digits "1" through "9."

The "start" tube (Fig. 1–A) has its anode 45 connected directly to an anode potential supply conductor 46, which normally has a potential of +125 volts applied thereto from point 47 in the cathode circuit of an extinguishing tube 48.

The control grid 49 of the "start" tube is normally biased to prevent conduction in the tube by being connected over resistor 50, of 47,000 ohms, point 51, and resistor 52 of 1 megohm to the terminal 36, to which a potential of −30 volts is applied.

The cathode 60 of the "start" tube is given a potential slightly more negative than ground when the tube is non-conducting. This potential is obtained by connecting the cathode at point 61 in a resistance-capacitance network extending from point 62 on conductor 63—to which a potential of −108 volts is applied at terminal 64—over resistor 65 of 1.8 megohms, point 66, resistor 67 of 1.6 megohms, point 68, resistor 69 of 15,000 ohms, point 61, and resistor 70 of 22,000 ohms to ground. Point 68 in this circuit is coupled to ground over a capacitor 71 of 1,000 micro-microfarads. When conduction occurs in the "start" tube, its cathode 60 will also be conductively coupled to the anode 45, and its potential will change from slightly negative to positive with respect to ground.

The auxiliary or shield grid 72 of the "start" tube is connected to the cathode 60 and will have the same potentials as the cathode.

The "start" tube is the first tube in the chain and is followed by the "9," "8," "7," "6," "5," "4," "3," "2," and "1" priming tubes in that order. The circuits for the various priming tubes are similar and will be clear from an explanation of the circuits for the "9" priming tube (Fig. 1–A).

The anode 75 of the "9" priming tube is connected directly to the anode potential supply conductor 46.

The auxiliary or shield grid 76 of the "9" priming tube is connected over resistor 77 of 47,000 ohms, point 78, and resistor 79 of 1 megohm to negative potential supply conductor 80, which is connected to terminal 36 and has a potential of −30 volts applied thereto. The auxiliary grid 76 is also coupled over point 78 and capacitor 74 of 10 micro-microfarads to a driving impulse input conductor 73, which connects over points 41 and 42 to point 39 in the cathode circuit for tube 32 and receives a positive driving impulse of about 150 volts each time tube 32 conducts momentarily.

The control grid 81 of the "9" priming tube is connected to point 66 in the cathode potential supply circuit for the "start" tube and, with the "start" tube non-conducting, has a normal negative bias sufficient to prevent the "9" priming tube from becoming conducting even though driving impulses are applied to the auxiliary grid. When the "start" tube has been fired and is conducting, the positive potential of its cathode 60 will be reflected on the potential of the control grid 81 of the "9" priming tube and will reduce the negative bias thereon to a point where the tube can become conducting in response to a driving impulse impressed on its auxiliary grid.

The cathode 82 of the "9" priming tube is supplied with potential from a resistance-capacitance network, like the one for the "start" tube, which extends to ground from the negative potential supply conductor 63.

Each of the priming tubes for the digits "8" to "1" inclusive has an anode potential supply circuit and a cathode potential supply circuit like those for the "9" priming tube, each has a negative potential supply circuit for its auxiliary or shield grid and capacitance coupling from its auxiliary grid to the driving impulse input conductor 73, similar to those described above in connection with the "9" priming tube, and each has its control grid connected to the cathode potential supply circuit of the preceding tube in the chain to be primed thereby upon conduction occurring in the preceding tube.

It is to be noted that the driving impulses from tube 32 are not effective to cause an unprimed tube to conduct; consequently the impulses will be ineffective on any of the priming tubes of chain until the "start" tube has been fired and primes the "9" priming tube. The "start" tube is fired in the following manner. Point 51 in the control grid circuit for the "start" tube is coupled over conductor 85, capacitor 86 of 10 micro-microfarads, and point 87 to the motor bar or start key switch 88, which is normally open but which can be closed to connect point 87 to conductor 89, which extends to terminal 90, to which a potential of +250 volts is applied. When the motor bar or start key switch 88 is closed and the +250 volts is applied to capacitor 86, a positive impulse will be impressed on the control grid 49, which impulse is sufficient to fire the "start" tube, thereby priming or conditioning the "9" priming tube so that it can respond and be fired by the next driving impulse on conductor 73. Point 87 in the motor bar or start key control circuit is connected to ground over resistor 95 of 47,000 ohms to provide a discharge path through which capacitor 86 can be discharged when the motor bar or start key switch 88 is opened.

Each of the priming tubes, when fired, will prime the next tube of the chain, so that it will be fired by the next driving impulse. Accordingly, after the "start" tube has been fired by the closing of the start key switch 88, the next nine driving impulses will fire the tubes of the priming chain one after another.

The tubes of the chain, being gas tubes, will remain conducting, once they are fired, until they are extinguished by the operation of an extinguishing means which includes the tube 48. This operation of the extinguishing means takes place after the last tube in the chain has been fired and has effected its control, at which time all the tubes of the chain are rendered non-conducting.

Since the priming tubes of the chain are fired in sequence by successive driving impulses and are all extinguished at the same time, the several tubes will be conducting for progressively longer periods of time; that is, the "9" priming tube will be conducting longer than the "8" tube, the "8" tube will be conducting longer than the "7" tube, etc.

Each priming tube controls a related impulse-train-producing tube by priming that tube as long as the priming tube is conducting, and enables the driving impulses from tube 32, which are impressed continuously on the impulse-train-producing tubes, to become effective to operate the tube and produce a train of imulses corresponding in number to the digit to which the priming tube is related. For example, the impulse-train-producing tube related to the "9" priming tube will produce a train containing nine impulses, the impulse-train-producing tube which is related to the "8" priming tube will produce a train of eight impulses, etc., the impulse-train-producing tube related to the "1" priming tube producing one impulse.

The circuits and controls for the impulse-train-producing tubes are similar, and it is believed that an understanding of the operation of all these tubes will be clear from a description of the operation of one of them.

The impulse-train-producing tube for producing a train of nine impulses is representative and is shown at 100 in Fig. 1–A. This tube is shown as a separate triode, but preferably it is one half of a twin triode, such as the above-mentioned 2C51 type of tube. The tube has its anode 101 connected directly to conductor 19, which, as explained earlier herein, has a potential of +250 volts applied thereto at terminal 20. The cathode 102 of the tube is connected over point 103 and resistor 104 of 2,200 ohms to point 105 on potential supply conductor 106, which has a potential of +130 volts applied thereto at terminal 107. This anode-cathode potential supply circuit has a very low impedance and will produce a strong positive impulse of about 55 volts at point 103 each time the tube 100 is operated.

Control grid 109 of tube 100 is connected over point 110 and resistor 111 of 100,000 ohms to point 112 in the cathode potential supply circuit for the "9" priming tube. Point 110 in the grid circuit is also coupled over a capacitor 113 of 250 micro-microfarads to the driving impulse input conductor 114, which is connected over points 41 and 42 to point 39 in the circuit of the driving impulse generating tube 32. When the "9" priming tube is not conducting, point 112 in its cathode circuit and consequently grid 109 of the impulse-train-producing tube 100 will be slightly negative with respect to ground, and, since the cathode 102 is at a potential of +130 volts, the tube 100 will be biased sufficiently past cut-off that the driving impulses on conductor 114 will be ineffective to cause conduction in tube 100. However, when the "9" priming tube is conducting and its cathode has become positive, point 112 will become more positive and reduce the bias on tube 100 to a point where the driving impulses on conductor 114 will be effective to cause momentary conduction in the tube 100 and thereby provide positive impulses at point 103. Capacitor 115, which is similar to capacitor 71 in the cathode circuit of the "start" tube, delays the application of the priming potential to grid 109 sufficiently that the impulse which fires the "9" priming tube will have passed before tube 100 is ready for operation. The first driving impulse that will be effective on tube 100 will be the same one that fires the "8" priming tube.

Conductor 120 is connected to point 103 and will have the positive impulses at point 103 impressed thereon. Switch 121, which can be closed by a "9" digit key or any other switch-operating device in the units denominational order, will connect the conductor 120 to a units denominational output conductor 122. Similarly, a switch 123 can be closed by a "9" digit or other switch-operating device in the tens denominational order to connect the conductor 120 to a tens denominational output conductor 124. While only two sets of switches and two denominational output conductors have been shown, it is obvious that as many can be provided as are needed according to the denominational capacity desired.

Each of the other impulse-train-producing tubes has connections similar to the ones given above and is capable of producing the required number of impulses which can be switched to output conductors 122 and 124 as desired. The use of the low impedance source of impulses allows the impulses to be switched to a plurality of output conductors without impairing the ability of the impulses to operate the accumulator.

The driving impulse, which follows the driving impulse which fires the "1" priming tube, will be effective on the primed impulse-train-producing tubes to cause the last impulse in each train to be generated and will be effective on the primed tube 144 (Fig. 1-B) to cause that tube to operate and generate the impulse for effecting an entry of the digit "1" in the accumulator. This impulse which is generated by tube 144 goes out over conductor 145, from which it can be switched to output conductors, as 122 and 124. The impulse on conductor 145 also is used to operate the extinguishing means to cause the tubes of the chain to be extinguished and remove the priming from the impulse-train-producing tubes.

As explained earlier herein, the anodes of the "start" tube and the priming tubes "1" to "9" are connected to conductor 46. The potential of conductor 46 is derived from an impedance network having one branch which extends from point 150 on −108-volt conductor 63, over resistor 151 of 56,000 ohms, point 152, and to ground over resistor 153 of 500,000 ohms, and having another branch which extends from point 152, over point 47, to the cathode 154 of the extinguishing tube 48, and through the tube whose anode 155 is directly connected to conductor 89, to which a potential of +250 volts is applied. Tube 48 is preferably of the type sold by Radio Corporation of America under the type designation 6AQ5, and, by varying the impedance thereof, the potential applied to conductor 46 and to the anodes of the tubes of the chain can be controlled.

Normally, the potential on the control grid 156 of tube 48 is such that the tube will conduct sufficiently to give its cathode 154 and the conductor 46 a potential of +125 volts. However, when the potential on the grid 156 of tube 48 is modified to increase the impedance of the tube so that less current flows therethrough, the cathode potential and that of conductor 46 will become less positive and even may become negative with respect to ground, thereby causing the anode potential of the conducting tubes of the chain to drop below their cathode potential and the tubes to be extinguished.

The potential of grid 156 is controlled from a resistor 160 in the anode circuit of a twin triode control tube 161, which is preferably of the type sold by Radio Corporation of America under the type designation 12AX7. The anodes 162 and 163 are connected together and over the resistor 160 of 470,000 ohms to conductor 89, to which a potential of +250 volts is applied.

The cathode 164 of one of the triodes of tube 161 is connected directly to terminal 165 and has a potential of +65 volts applied thereto. The cathode 166 of the other triode of tube 161 is connected directly to terminal 167, to which a potential of −98 volts is applied.

Grid 170 cooperates with the anode 163 and the cathode 164 to determine the normal potential applied to grid 156 of tube 48. Grid 170 is supplied with the required potential from an adjustable tap 171 on resistor 153.

Grid 172 cooperates with the anode 162 and the cathode 166 of tube 161 and is effective therethrough to modify the potential of grid 156 of extinguishing tube 48 to increase the impedance of this tube and cause the extinguishing of the tubes of the chain.

The impulse which is generated by tube 144 and is applied to conductor 145 is impressed on grid 172, either directly or through an impulse-widening device, and will cause the extinguishing of the tubes of the chain. In the disclosed embodiment, the impulse on conductor 145 will be applied through an impulse-widening device. Conductor 145 is coupled through a capacitor 175 of .005 microfarad to the anode 176 of a diode 177. Preferably this diode is one half of a twin diode tube of the type sold by Radio Corporation of America under the type designation 6AL5. Anode 176 of the diode 177 is also connected over resistor 178 of 39,000 ohms and conductor 179 to conductor 63, which has a potential of −108 volts applied thereto. Cathode 180 of the diode is also connected to conductor 179 over a resistor 181 of 1 megohm in parallel with a capacitor 182 of 250 micro-microfarads. Point 183 in this circuit is connected over resistor 184, of 200,000 ohms, to the grid 172 of the control tube.

A positive impulse on conductor 145 will be effective, through the low impedance of the diode 177, to charge capacitor 182 and make point 183 and the grid 172 connected thereto more positive. Since the discharge paths for the capacitor 182 are through the resistor 181 of 1 megohm and the high back impedance of the diode 177, the grid 172 will remain positive for a longer time than that required for the impulse on conductor 145.

When grid 172 becomes more positive and more current flows through resistor 160, grid 156 will become more negative and increase the impedance of tube 48, thereby to reduce the anode potential applied to the tubes of the chain sufficiently to cause the conducting tubes to be extinguished.

The impulse-widening means, while not necessary, provides an additional factor of safety in the operation of the device, because it allows the anode potential for the tubes of the chain to be depressed for a longer period of time than required to deionize them and insures that all tubes of the chain will be extinguished.

Accordingly, for each operation of the "start" tube, impulse-train-producing tube 100 will produce a train of nine impulses on conductor 120; tube 130 will produce a train of eight impulses on conductor 131; tube 132 will produce a train of seven impulses on conductor 133; tube 134 will produce a train of six impulses on conductor 135; tube 136 will produce a train of five impulses on conductor 137; tube 138 will produce a train of four impulses on conductor 139; tube 140 will produce a train of three impulses on conductor 141; tube 142 will produce a train of two impulses on conductor 143; and tube 144 will produce an impulse on conductor 145. Each impulse train is common to the plurality of denominational output conductors, and the trains of impulses can be switched to the output conductors according to the digits desired to be entered into the various denominations of the accumulator.

If no entry is to be made in a denominational order of the accumulator, a zero switch, as 146, for that order is closed to connect the related output conductor over a resistor 147 of 2,200 ohms to provide a comparable low impedance loading for the output conductor when it is not otherwise connected to an impulse-train-producing tube.

It should be noted that the "start" tube and its controls will allow only one impulse-train-producing operation of tubes 100, 130, 132, 134, etc., for each closure of the motor bar or key switch 88, because, as long as the switch remains closed, capacitor 86 will remain charged, and no additional firing impulses can be applied to the control grid 49 of the "start" tube.

The impulse generator also includes a transfer-effecting impulse-generating means which is normally operated by the driving impulses from tube 32 but which is controlled from the "start" tube to prevent transfer-effecting impulses from being generated during digit entries in the accumulator.

The transfer-effecting impulse-generating tube 190 (Fig. 1-A), which preferably is one half of the above-noted 2C51 type of tube, has its anode 191 connected over resistor 192 of 27,000 ohms, point 193, and conductor 194 to conductor 19, to which is applied a potential of +250 volts, and has its cathode 195 connected to ground over resistor 196 of 4,700 ohms. Control grid 197 is connected to ground over point 198 and resistor 199 of 100,000 ohms. Control grid 197 is also coupled from point 198 over capacitor 200 of 25 micro-microfarads and point 42 to point 39 in the cathode circuit of the driving impulse generator tube 32 and enables the driving impulses to be applied to tube 190.

The operation of tube 190 is controlled by a tube 205, which preferably is the other half of the twin triode with tube 190. This tube 205 controls tube 190 by controlling its cathode potential and thereby controls the bias effect of grid 197. Anode 206 of tube 205 is connected over point 193 and conductor 194 to conductor 19, and the cathode 207 is connected over resistor 196 to ground.

Grid 208 normally is given a negative bias by being connected over resistor 209 of 100,000 ohms and conductor 210 to the cathode of the "start" tube. This will cause tube 205 normally to be non-conducting, thereby allowing the potential of cathode 195 of tube 190 to be controlled by self-bias of the tube.

Positive driving impulses from point 39 will cause increased conduction in tube 190 to provide negative impulses continuously at its anode as long as the oscillator is functioning and while the "start" tube is not conducting. These negative impulses are transmitted over conductor 212 and resistors 213 and 214 (Fig. 1-B), each of 47,000 ohms, to transfer means in the accumulator to effect tens transfer entries whenever they are required. The manner in which the transfer-effecting impulses operate the tens transfer means to effect tens transfer entries will be explained more fully hereinafter.

Since the impulses of the trains for effecting digit entries and the transfer-effecting impulses are generated in response to the same driving impulses, they would both be generated at the same time in a digit-entering operation, and transfers would possibly be lost in the digit entry. To prevent this, the transfer-effecting impulse-generating tube 190 is rendered non-responsive to driving impulses during an impulse-train-generating operation to prevent the transfer entries from being made until after a digit entry has been completed. This disabling of tube 190 is effected by tube 205, which is controlled from the "start" tube. When the "start" tube is fired to initiate an impulse-train-generating operation, its cathode potential will change from negative to positive with respect to ground. This potential change is applied over conductor 210 and resistor 209 to the grid 208 of tube 205 and causes the tube to conduct. Conduction in tube 205 will increase the drop across resistor 196 and make the potential of its cathode 207 and also that of cathode 195 of tube 190 more positive.

Cathode 195 will become more positive than its related grid 197 and will have the effect of biasing the tube 190 sufficiently past cut-off that the positive impulses from the driving impulse tube 32 will no longer be operable to cause the tube 190 to generate transfer-effecting impulses.

As soon as the last impulse of the impulse train has been generated, the "start" tube and the "priming" tubes will be extinguished, as explained earlier herein, and tube 205 will again be biased to cut-off, thereby removing the blocking bias from tube 190, which can again respond to the driving impulses and generate transfer-effecting impulses for causing any necessary tens transfers to be made.

*Accumulator*

Figure 2:
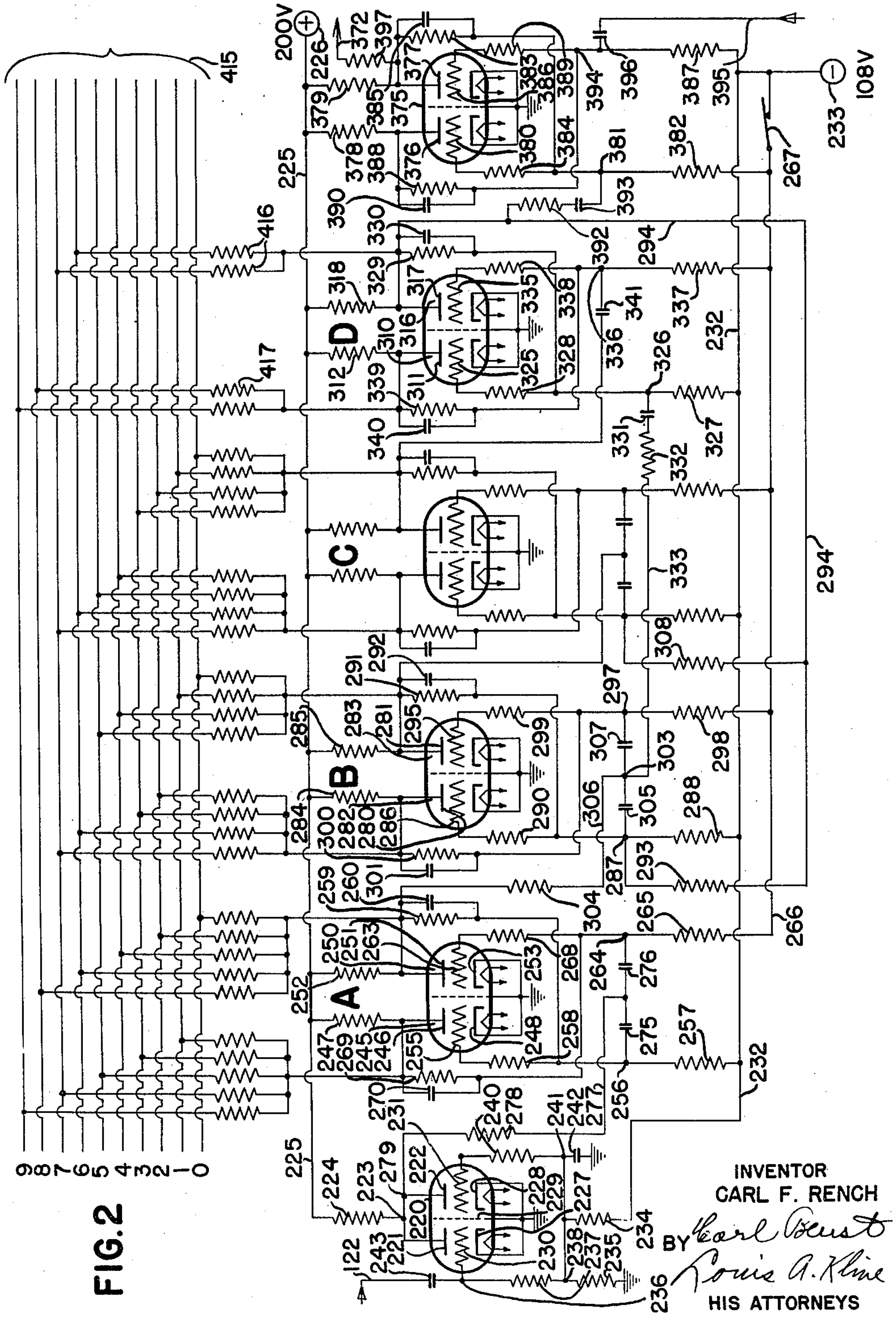
Fig. 2 shows a circuit diagram of the units denominational order of the accumulator, including tens transfer means and coupling means through which entries can be made from the impulse generator of Figs. 1-A and 1-B, and shows schematically a digit-manifesting means.
Figure 3:
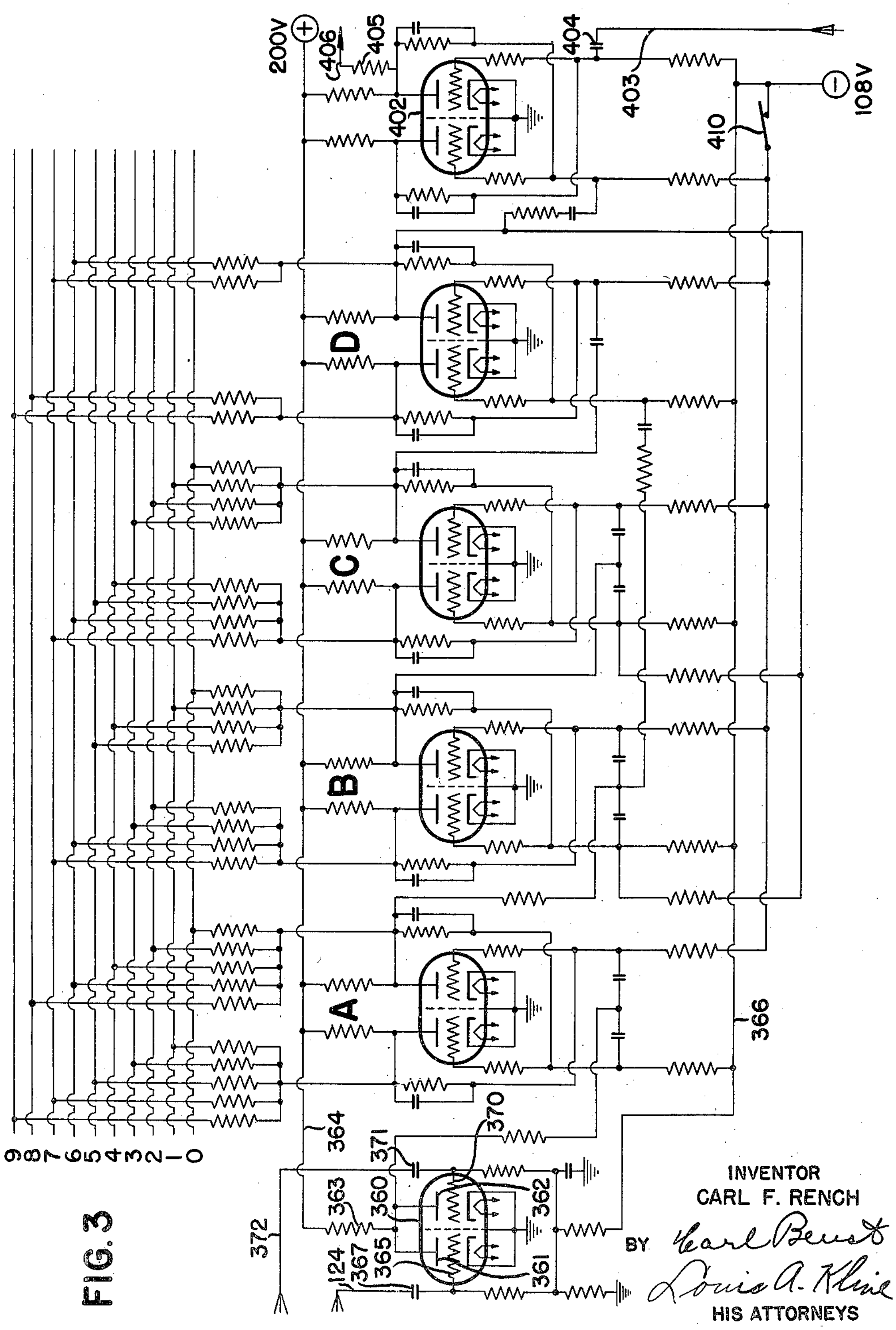
Fig. 3 shows a circuit diagram of the tens denominational order of the accumulator which is similar to that of the units denominational order but which can also receive entries from the tens transfer means of the units order as well as tens denominational digit entries from the impulse generator.

Two denominational orders of the accumulator are shown in Figs. 2 and 3.

Each denominational order includes an electronic coupling device, an electronic tens transfer means, and a plurality of interrelated electronic devices capable of accumulating in the decimal notation and representing, in combinational form, the units digit of said accumulation.

Fig. 2 shows the units denominational order of the accumulator.

The coupling device is shown as a twin triode, tube 220, preferably of the above-noted 2C51 type, though, as will appear later, only one of the triodes is utilized in the units order, the one for coupling the order of the accumulator to the corresponding denominational output conductor of the impulse generator. In the embodiment shown, there are no tens transfer entries to be made in the units denominational order of the accumulator, and accordingly the other of the triodes is not used to control entries therein.

Tube 220 has both of its anodes 221 and 222 connected together over point 223 and resistor 224 of 100,000 ohms to conductor 225, to which a potential of +200 volts is applied at terminal 226, and has its cathodes 227 and 228 and its shield 229 grounded.

Grids 230 and 231 have biasing potential supplied thereto from a biasing potential supply circuit which extends to ground from conductor 232, to which a potential of −108 volts is applied at terminal 233, over resistor 234 of 100,000 ohms and resistor 235 of 15,000 ohms, grid 230 being connected over point 236, and resistor 237 of 47,000 ohms to point 238 in the bias potential supply circuit, and grid 231 being likewise connected over a resistor 240 of 47,000 ohms to point 241 in the bias potential supply circuit. Point 241 is connected to ground over a stabilizing capacitor 242 of 500 micromicrofarads. The potential supplied to the grids normally biases both halves of the tube to cut-off.

The units denominational output conductor 122 (Figs. 1-A, 1-B, and 2) of the impulse generator is coupled over capacitor 243 of 250 micromicrofarads to grid 230, which controls conduction between anode 221 and cathode 227 of the left triode in the tube 220. Whenever an impulse of an impulse train is impressed on conductor 122, it will be effective to cause the triode, which is controlled by grid 230, to conduct and produce a potential drop at point 223 due to resistor 224 in its anode circuit.

In the units denomination of the disclosed embodiment of the accumulator, grid 231, which controls the right-hand triode of the tube 220, will have no impulses applied thereto, so this triode of the tube will remain biased to cut-off.

The potential drops which are produced at point 223 when conduction occurs in the tube are used to provide negative impulses to operate the interrelated devices of this denominational order for accumulating amounts. The interrelated devices consist of four trigger pairs connected in cascade and with novel direct-current feed back circuits and auxiliary controls to enable the four trigger pairs to accumulate values in the decimal notation and to represent the various digits of the notation by different combinations of "on" or "off" conditions of the trigger pairs.

As is well known, an electronic device known as a trigger pair consists of a pair of electron discharge tubes having interconnections therebetween to control their operation so that, at any given time, one of the tubes is conducting and the other tube is non-conducting, and the act of changing the conducting condition of one of the tubes will cause the conducting condition of the other of the tubes of the pair to change. With the circuit constants to be given herein, the trigger pairs will be relatively insensitive to positive impulses but will respond to negative impulses, so that a negative input impulse applied commonly to the tubes of the pair or to the conducting tube of the pair will cause reversal of the conducting and non-conducting condition of the tubes. The trigger pair may be made up of two separate tubes; however, in order to provide a more compact device, each of the cascaded trigger pairs in the disclosed embodiment of the invention is formed by interconnecting the two halves of a twin triode type of tube, preferably of the aforementioned 2C51 type.

The first trigger pair of the cascade will be that marked A, the second trigger pair will be B, the third trigger pair will be C, and the fourth and final trigger pair of the cascade will be D. The trigger pairs will be considered in their "on" condition when the left triode of the trigger pair is conducting and in their "off" condition when the left triode of the trigger pair is in non-conducting condition. The manner in which the trigger pairs represent the various digits can be seen from the following table, in which "O" designates the "off" condition and "X" designates the "on" condition of a trigger pair.

| Digit | A | B | C | D |
|---|---|---|---|---|
| 0 | O | O | O | O |
| 1 | X | O | O | O |
| 2 | O | X | O | O |
| 3 | X | X | O | O |
| 4 | O | O | X | O |
| 5 | X | O | X | O |
| 6 | O | X | X | O |
| 7 | X | X | X | O |
| 8 | O | X | X | X |
| 9 | X | X | X | X |
| 0 | O | O | O | O |

Trigger pair A is the first trigger pair of the cascade and is operated by impulses impressed thereon from the coupling device, tube 220. The left triode 245 of the trigger pair has its anode 246 connected over resistor 247 of 100,000 ohms to the +200-volt conductor 225 and has its cathode 248 connected directly to ground.

Similarly, the right triode 250 of the trigger pair has its anode 251 connected over resistor 252 of 100,000 ohms to the +200-volt conductor 225 and has its cathode 253 directly connected to ground. Grid 255 of the left triode 245 is connected to a negative bias supply over resistor 258 of 100 ohms, point 256, resistor 257 of 510,000 ohms, and conductor 232, to which a potential of −108 volts is applied at terminal 233, and also is coupled to the anode 251 of the right triode 250 over a network containing the resistor 258 and resistor 259 of 200,000 ohms, resistor 259 being shunted by capacitor 260 of 150-micro-microfarads. In a similar manner, the grid 263 of the right triode 250 is connected to the negative bias supply over resistor 268 of 100 ohms, point 264, resistor 265 of 510,000 ohms, and to conductor 266, which is connected over a reset switch 267 to terminal 233. Grid 263 is also coupled to the anode 246 of the left triode 245 over a network containing the resistor 268 and resistor 269 of 200,000 ohms, resistor 269 being shunted by capacitor 270 of 150-micro-microfarads.

Points 256 and 264 in the bias supply circuits for the grids 255 and 263 are coupled, respectively, over capacitors 275 and 276 of 25 micro-microfarads to a conductor 277, thence over resistor 278 of 47,000 ohms to the point 279 in the anode circuit of the coupling device, tube 220.

With the circuit constants given, trigger pair A will be responsive to negative impulses and will reverse the conducting status of the triodes therein each time a negative impulse is impressed on the grids of the triodes. Accordingly, the trigger pair will reverse its conduction status each time the coupling device responds to an impulse from the impulse generator and sends a negative impulse to the pair.

Trigger pair B, which is the second trigger pair of the cascade, is operated to reverse the conductive condition of the triodes therein in response to an impulse impressed thereon from trigger pair A when that pair goes from its "on" condition to its "off" condition. Trigger pair B is also operated from its "off" condition to its "on" condition in response to a novel direct-current feed-back connection from trigger pair D in a manner to be explained more fully hereinafter. The anodes 280 and 281, respectively, of the left triode 282 and the right triode 283 of this pair are connected over resistors 284 and 285 of 100,000 ohms, respectively, to the +200-volt conductor 225, and the cathodes are connected to ground.

Grid 286 of the left triode 282 is connected over resistor 290 of 100 ohms to point 287 in a bias potential supply resistance network. This network extends from conductor 232, to which a potential of −108 volts is applied, over resistor 288 of 390,000 ohms, point 287, and over resistor 293 of 390,000 ohms and conductor 294 of the novel direct-current feed-back circuit to the anode of the right triode of trigger pair D and enables the bias on grid 286 to be varied according to the "on" and "off" condition of trigger pair D in a manner to be explained more fully hereinafter. Grid 286 is also coupled to the anode 281 of the right triode 283 over a network containing the resistor 290 and resistor 291 of 390,000 ohms, resistor 291 being shunted by capacitor 292 of 150-micro-microfarads.

Grid 295 of the right triode 283 is connected to the negative bias supply by being connected over resistor 299 of 100 ohms, point 297, and resistor 298 of 510,000 ohms to conductor 266. Grid 295 is also coupled to the anode 280 of the left triode 282 over the resistor 299 and resistor 300 of 390,000 ohms, resistor 300 being shunted by a capacitor 301 of 150 micro-microfarads.

Point 287 in the bias supply circuit for grid 286 is connected over capacitor 305 of 25 micro-microfarads and point 303 to conductor 306, and thence over resistor 304, of 47,000 ohms, to the anode 251 of the right triode 250 of trigger pair A. Point 297 in the bias supply circuit for grid 295 is also coupled to conductor 306 over a capacitor 307 of 25 micro-microfarads. The bias applied to the grids of trigger pair B is such that each time trigger pair A is operated to its "off" condition and its right triode 250 conducts, the negative impulse which is sent over capacitors 304 and 307 to the grids 286 and 295 of the trigger pair B will cause a reversal of the conducting condition of the triodes.

Trigger pair C, which is the third trigger pair of the cascade, is operated to reverse the conducting condition of the triodes therein in response to an impulse from trigger pair B when that pair goes from its "on" condition to its "off" condition. Trigger pair C also has potential applied to the grid of its left triode from a resistance network which includes resistor 308, of 390,000 ohms, and the conductor 294 of the direct-current feed-back circuit from the anode of the right triode of trigger pair D, which circuit is effective to cause trigger pair C to be operated from its "off" condition to its "on" condition, when trigger pair D is turned to its "on" condition, in a manner to be explained more fully hereinafter. The circuit arrangement and circuit constants for trigger pair C are identical with those of trigger pair B and will not be repeated.

Trigger pair D, which is the last trigger pair in the cascade, is operated from its "off" condition to its "on" condition by impulses impressed on its right triode from trigger pair C and is also operated from its "on" condition to its "off" condition in response to impulses directly applied to the grid of its left triode from trigger pair A. Trigger pair D is effective, when in "on" condition, to cause trigger pairs B and C to be turned from "off" to "on" over the novel direct-current feed-back circuits thereto. Trigger pair D is also effective to send an impulse to a tens transfer means to prepare it for a tens transfer operation.

The left triode 310 of trigger pair D has its anode 311 connected over resistor 312 of 100,000 ohms to the +200-volt conductor 225 and has its cathode connected to ground. In this trigger pair, the right triode 316 has its anode 317 connected over resistor 318 of 80,000 ohms to the +200-volt conductor 225, and has its cathode connected to ground.

Grid 325 of the left triode 310 is connected to the negative bias supply over resistor 328 of 100 ohms, point 326, resistor 327 of 510,000 ohms, and conductor 232, and is also coupled to the anode 317 of the right triode 316 over the resistor 328 and resistor 329 of 390,000 ohms, resistor 329 being shunted by capacitor 330 of 500 micro-microfarads.

Similarly, the grid 335 of the right triode 316 is connected to the negative bias supply over resistor 338 of 100 ohms, point 336, resistor 337 of 510,000 ohms, and conductor 266. Grid 335 is also coupled to the anode 311 of the left triode 310 over the resistor 338 and resistor 339 of 390,000 ohms, resistor 339 being shunted by capacitor 340 of 150 micro-microfarads.

The point 336 in the bias potential supply circuit for grid 335 of the right triode is coupled over capacitor 341, of 25 micro-microfarads, to the anode of the right triode of trigger pair C and receives a negative impulse therefrom each time trigger pair C goes from "on" to "off" in the change from a digit representation of "7" to "8." This negative impulse which is applied to grid 335 will cause trigger pair D to go from its "off" condition to its "on" condition.

The point 326 in the potential supply circuit to grid 325 of the left triode is connected over capacitor 331, of 25 micro-microfarads, resistor 332, of 47,000 ohms, and conductor 333 to point 303 in the circuit from trigger pair A to the grids of the triodes of trigger pair B. The negative potential impulses which are sent from trigger pair A to trigger pair B when trigger pair A is turned from "on" to "off" are also applied over the conductor 333, resistor 332, and capacitor 331 to the grid 325 to turn trigger pair D from "on" to "off." As is seen from the chart given earlier herein, trigger pair D is in "off" condition for all digit representations except "8" and "9," so that the impulses from trigger pair A when it changes from a representation of "1" to "2," from "3" to "4," from "5" to "6," and from "7" to "8" will not be effective to cause trigger pair D to change its conducting status. The only impulse from trigger pair A which is effective to turn trigger pair D from "on" to "off" is that which is generated by the turning of trigger pair A from "on" to "off" in changing from the digit representation of "9" to "0."

The manner in which trigger pair D exerts its control over the trigger pairs B and C through the direct-current feed-back circuits, and is controlled to enable this control to be used, is as follows:

As is clear from the chart given earlier herein, trigger pair D is in its "off" condition for digit representations of "0" to "7," and, when trigger pair D is in "off" condition, its right triode will be conducting and anode 317 will be at about +15 volts potential due to the drop across its anode resistor 318 and to the low impedance of the conducting triode. The potential of the anode under this condition will be reflected on the potential of the grid 286 of the left triode of trigger pair B and the corresponding grid of trigger pair C, through the direct-current feed-back circuit and their respective resistance networks, to give these grids a normal bias which will allow the trigger pairs respectively to operate in response to negative impulses from trigger pairs A and B, as is necessary in the combinational representation of the various digit values.

When trigger pair D goes to its "on" condition from "off" condition, in the changing of the representation from "7" to "8," the right triode 316 will change from conducting condition to non-conducting condition, and the potential of anode 317 will rise to a sufficiently positive potential that, when it is reflected back on the grids of the left triodes of trigger pairs B and C over the direct-current feed-back circuit, it will cause the steady bias potential of these grids to become positive enough to cause the left triodes of these trigger pairs to become conducting and, through the trigger connections, cause these trigger pairs to go from their "off" condition to their "on" condition as required for the combinational representation of the digit "8."

Trigger pairs B and C will remain in their "on" condition when the cascaded trigger pairs represent the digit "9."

When the impulse is applied to the cascaded trigger pairs to change the representation from "9" to "0," it will first cause the trigger pair A to change from "on" to "off," and, in turning "off," trigger pair A will send a negative impulse to trigger pairs B and D, the impulse on trigger pair D changing the pair from "on" to "off" and thereby removing the positive bias which was supplied to the grids of the left triodes of trigger pairs B and C. With the reduction of this positive bias on the left triode of trigger pair B, the remaining effect of the negative impulse from trigger pair A causes trigger pair B to turn from its "on" condition to its "off" condition, and the impulse from trigger pair B, as it turns to "off," will turn trigger pair C from its "on" condition to its "off" condition. The impulse from trigger pair C will not be effective to cause trigger pair D to go from its "off" condition to its "on" condition, because the above changes in the status of trigger pairs B and C is so rapid that the impulse from trigger pair C will be impressed on trigger pair D before the charges stored on capacitors 330 and 340, in the turning of trigger pair D from "on" to "off," have been dissipated.

It is to be noted that, with the novel direct-current feed-back circuits and the associated controls, the four cascaded trigger pairs can be operated to accumulate values in the decimal notation in a very simple manner. The feed-back and controls of the denomination are effected with the minimum of additional components, since two resistors—resistors 293 and 308 in the feed-back circuits—are the only components required in addition to the usual trigger and cascade connections. The novel controls eliminate the need of additional capacitors, rectifiers, or other control tubes which previously have been required to enable the desired results to be obtained. Consequently the novel arrangement results in a smaller and more compact denominational unit.

The manner in which the various trigger pairs are operated in combinations to represent digits of the decimal notation will now be explained in an operation in which ten impulses are sent to the denomination to operate it through a complete cycle and return it to starting condition. As shown in the tabulation given earlier herein, the zero or starting condition of the trigger pairs of the denomination is that in which all the trigger pairs A, B, C, and D are in "off" condition, with their right triodes conducting. All input impulses to the denomination are applied to the coupling device, tube 220, which in turn applies them to trigger pair A, the first trigger pair of the cascade.

The first impulse applied to trigger pair A changes it from its "off" condition to its "on" condition, so that the trigger pair A will be "on" and trigger pairs B, C, and D will be "off" to represent the digit "1."

The second impulse applied to trigger pair A changes it from "on" to "off." As trigger pair A goes from "on" to "off," it sends an impulse to trigger pair B, which turns trigger pair B from "off" to "on." At the end of this entry, trigger pairs A, C, and D are "off," and trigger pair B is "on" to represent the digit "2."

The third impulse applied to trigger pair A merely changes that pair from "off" to "on." At the end of this entry, trigger pairs A and B are "on" and trigger pairs C and D are "off" to represent the digit "3."

The fourth impulse applied to trigger pair A turns trigger pair A from "on" to "off," and trigger pair A, in turning "off," sends an impulse to trigger pair B to turn it from "on" to "off." Trigger pair B, in turning from "on" to "off," sends an impulse to trigger pair C to turn it from "off" to "on." At the end of this entry, trigger pairs A, B, and D are "off" and trigger pair C is "on" to represent the digit "4."

The fifth impulse applied to trigger pair A merely turns this trigger pair from "off" to "on," and, at the end of this entry, trigger pairs A and C will be "on" and trigger pairs B and D will be "off" to represent the digit "5."

The sixth impulse applied to trigger pair A will turn this trigger pair from "on" to "off," and, in turning from "on" to "off," trigger pair A will send an impulse to trigger pair B to turn it from "off" to "on." At the end of this operation, trigger pairs A and D will be "off," and trigger pairs B and C will be "on" to represent the digit "6."

The seventh impulse applied to trigger pair A will merely turn trigger pair A from "off" to "on," and, at the end of this entry, trigger pairs A, B, and C will be "on" and trigger pair D will be "off" to represent the digit "7."

The eighth impulse applied to trigger pair A will turn trigger pair A from "on" to "off," and the turning of trigger pair A "off" sends an impulse to trigger pair B to turn trigger pair B from "on" to "off." Trigger pair B, in turning "off," will send an impulse to trigger pair C to turn it from "on" to "off." Trigger pair C, in turning "off," will send an impulse to trigger pair D to turn it from "off" to "on." The turning of trigger pair "on" will cause the potential of the anode of its right triode to become more positive, and this is reflected through the direct-current feed-back circuit on the bias supplies for the grids of the left triodes of trigger pairs B and C to make these grids sufficiently positive to return trigger pairs B and C to their "on" condition. At the end of this entry, trigger pairs B, C, and D will be "on," and trigger pair A will be "off" to represent the digit "8."

The ninth impulse applied to trigger pair A will merely turn trigger pair A from "off" to "on," so that, at the end of this entry, all the trigger pairs will be "on" to represent the digit "8."

The tenth impulse which is applied to trigger pair A will turn trigger pair A from its "on" condition to its "off" condition, and trigger pair A, in turning to its "off" condition, will send an impulse to trigger pairs B and D to turn them from "on" to "off." Trigger pair D, in turning "off," will remove the positive bias from the grids of the left triodes of trigger pairs B and C. With the positive bias removed, trigger pair B can be turned "off" from trigger pair A. Trigger pair B, in turning to its "off" condition, will send an impulse to trigger pair C to turn it from "on" to "off." Trigger pair C, in turning "off," will send an impulse to trigger pair D. Trigger pair D has already been turned to "off" by the impulse from trigger pair A, and, as explained earlier herein, the impulse from trigger pair C will not be effective to turn it "on" again. At the end of this entry, the trigger pairs A, B, C, and D will be in "off" condition, which is the condition in which they were at the beginning of the entry of the ten impulses.

It is seen, therefore, that the four cascaded trigger pairs of the denomination can be operated to accumulate values in the decimal notation and be returned to starting condition upon the application of ten impulses to the first trigger pair of the cascade and can represent the various digits "1" to "9" and "0" of the accumulator by combinations of "on" and "off" conditions of the several trigger pairs.

Fig. 3 shows the coupling device, the cascaded trigger pairs A, B, C, and D, and the tens transfer means of the tens denominational order of of the accumulator. The tens denominational order is representative of all intermediate orders of the accumulator. The highest denominational order of the accumulator would be the same as the intermediate orders except that it would be required to control a transfer means to transfer values to a higher order. Except for an additional control of the coupling device by which tens transfer entries can be made from a lower order, the circuits of this figure are the same as those for the units denominational order shown in Fig. 2. Where the circuit constants and circuits of Fig. 3 are the same as those of Fig. 2, the description of them will not be repeated.

The coupling device for the tens denominational order is a twin triode 360 (Fig. 3), similar to the twin triode 220 (Fig. 2). As is the case with the coupling device in Fig. 2, the anodes 361 and 362 (Fig. 3) are connected together and over a resistor 363, of 100,000 ohms, to a +200-volt conductor 364, and the cathodes are connected to ground. Grid 365 of the left triode is supplied with negative grid bias from conductor 366, to which −108 volts is applied, and is coupled over capacitor 367, of 250 micro-microfarads, to the tens denominational output conductor 124 of the impulse generator (Figs. 1–B and 3). The left triode is normally biased to cut-off but will conduct momentarily when the positive output impulses from the impulse generator are applied to grid 365. Each time this triode conducts, the drop across the anode resistor 363 will cause a negative impulse to be applied to the first trigger pair of the cascade to cause an advance in the digit represented by the operating condition of the cascaded trigger pairs, in the same manner as explained above for the units denomination.

Grid 370 of the right triode of the coupling device is supplied with negative biasing potential from conductor 366 and is coupled over capacitor 371, of 250 micro-microfarads, to conductor 372, which extends to the transfer means of the next lower order and receives a positive impulse each time a transfer entry is made from the lower order. Each positive transfer impulse which is applied to grid 370 will cause the right triode of the coupling device to conduct momentarily, which conduction will produce a drop across the anode resistor 363 similar to the one produced by an impulse from the impulse generator. This drop is applied as a negative impulse to the first trigger pair of the cascade to cause a unit advance in the digit representation of the cascaded trigger pairs.

*Tens transfer means*

Tens transfer means are provided for the accumulator to make an entry of a value of "one" in the next higher denominational order of the accumulator each time a denominational order exceeds its capacity. Since the same type of transfer means couples adjacent denominational orders of the accumulator, the operation of the various transfer means will be clear from a description of the operation of the means coupling the units and tens denominational orders of the accumulator.

The transfer means includes a trigger pair which is operated from a normal conducting condition when entries in the related denominational cascaded trigger pairs cause them to exceed their digital capacity and is effective to cause an entry in the next higher order when restored to normal condition.

The tens transfer trigger pair (Fig. 2) is shown as being made up of two halves of a twin triode, tube 375, preferably of the above-mentioned 2C51 type.

Anodes 376 and 377 of the left and right triodes of this trigger pair are connected, respectively, over resistors 378 and 379 of 100,000 ohms each to the +200-volt conductor 225, and the cathodes of these triodes are connected to ground.

Grid 380 of the left triode is coupled to the negative bias supply conductor 266 over resistor 384, of 100 ohms, point 381, and resistor 382, of 510,000 ohms, and also is coupled to anode 377 of the right triode by the trigger connection including the resistor 384 and the resistor 383 of 390,000 ohms, resistor 383 being shunted by capacitor 385 of 500 micro-microfarads. In a corresponding manner, grid 386 of the right triode is coupled to the negative bias supply conductor 232 over resistor 389, of 100 ohms, point 394, and resistor 387, of 510,000 ohms and also is coupled to anode 376 of the left triode by the trigger connection including the resistor 389 and resistor 388, of 390,000 ohms, resistor 388 being shunted by capacitor 390, of 150 micro-microfarads.

When the accumulator is initially set in operation or is reset to zero, the tens transfer trigger pair is set in its normal condition, with the left triode conducting, as will be explained more fully hereinafter when the resetting operation is considered.

When a tens transfer is required, the cascaded trigger pairs of the denomination will cause the tens transfer trigger pair to operate to reverse its conducting status. This is accomplished in the following manner. As is seen from the tabulation given earlier herein, the trigger pair D will change from its "on" condition to its "off" condition only when the digit represented by the cascaded trigger pairs changes from "9" to "0." The drop across anode resistor 318 of the right triode of this trigger pair, which occurs when the pair changes from "on" to "off," is applied as a negative impulse to grid 380 of the left triode of the tens transfer trigger pair, over resistor 392 of 100,000 ohms, capacitor 393 of 25 micro-microfarads, and point 381, and will cause the tens transfer trigger pair to be operated from its normal condition and reverse the conducting status of its triodes to store the carry indication until the carry can be effected.

As explained earlier herein in connection with the impulse generator, the transfer-effecting impulse-generating tube 190 (Fig. 1–A) is driven by the driving impulses from tube 32 and produces negative transfer-effecting impulses except when the impulse generator is generating digit-representing impulse trains. The negative impulses which are produced at the anode of tube 190 are transmitted over conductor 212, resistor 213, conductor 395, and capacitor 396 of 25 micro-microfarads to grid 386 of the right triode of the transfer trigger pair and will restore the trigger pair to its normal condition, if it had been operated from normal condition, to store a carry during a digit-entering operation. The return of the transfer trigger pair to its normal condition will mean that the right triode will cease to conduct, and consequently its anode potential will become more positive. The potential rise of anode 377 will be transmitted as a +125-volt impulse over resistor 397 of 47,000 ohms, conductor 372 (Figs. 2 and 3), and capacitor 371 to grid 370 of the right triode of the coupling device, tube 360, of the tens denominational order and will cause the entry of a value of "one" therein.

It is clear, therefore, that the tens transfer trigger pair will be operated from normal by its related denomination, when the accumulation in the cascaded trigger pairs has exceeded their digital capacity and the cascaded trigger pairs have indicated that a carry is required to the next higher order, and will store the carry indication until the end of the digit entry operation, at which time the first transfer-effecting impulse will return any operated tens transfer trigger pairs to their normal condition and cause the value of "one" to be entered in the next higher orders as required. The tens transfer effecting impulses are continuously applied to the transfer means between digit entries, so that, whenever a tens transfer entry causes a denomination to exceed its capacity and operate the tens transfer trigger pair from its normal condition, the following transfer-effecting impulse will be effective to return the trigger pair to its normal condition and cause the required tens transfer entry to be made, thereby enabling carry-on-carry operations to take place.

If the tens transfer trigger pair has not been operated from its normal condition during the digit entry in its related denominational order, the right triode will be in non-conducting condition and the negative transfer-effecting impulses, which will be impressed thereon immediately after the digit-entering period, will have no effect thereon.

The tens transfer means, which is controlled from the tens denominational order trigger pair D (Fig. 3), includes the twin triode 402, which has transfer-effecting impulses applied thereto from the tube 190 in the impulse generator over conductor 212, resistor 214, conductor 403, and capacitor 404, and which can send a transfer signal over resistor 405 and conductor 406 to the next higher or hundreds order of the accumulator when required.

In a similar manner, other transfer means can be controlled from the trigger pairs of their related orders and can be operated by transfer-effecting impulses to cause tens transfer entries to be made in appropriate higher orders.

*Resetting*

In order to prepare the accumulator initially to receive entries or to reset it to its zero condition, reset switches, as 267 in Fig. 2 and 410 in Fig. 3, are provided in the negative bias supply circuits for the grids of the right triodes of the trigger pairs A, B, C, and D of each denominational order. Momentary opening of the switches will remove negative bias potential from these grids and will cause the trigger pairs A, B, C, and D to be set in their "off" condition.

The transfer trigger pairs in the various orders are also conditioned by the operation of the reset switches, which removes negative bias from the grids of the left triodes of these trigger pairs and causes these trigger pairs to be set to their normal position, with the left triode conducting. This control of the transfer trigger pairs from the reset switches insures that these trigger pairs will always be set to their normal condition initially or after a resetting operation, and prevents any improper transfers from being made as a result of changing trigger pair D to its "off" condition in the initial setting or resetting operations.

*Digit-manifesting means*

Means are provided to manifest the digit values represented by the combinations of "on" and "off" conditions of the cascaded trigger pairs of the various denominational orders of the accumulator.

The means for manifesting digits in the units denominational order is shown in Fig. 2, and, since the manifesting means for other orders is the same as this one, their operation will be clear from the explanation of the one shown in Fig. 2.

Associated with the cascaded trigger pairs of this denominational order is a set of digit-representing conductors 415, containing a conductor for each of the digits "1" to "9" and "0." The anodes of the right and left triodes of the cascaded trigger pairs are connected through a resistance network selectively to various ones of the digit-representing conductors, the anode 317 of the right triode of trigger pair D being connected over resistors, as 416, of 1.3 megohms to the conductors representing "6" and "7," and the anodes of the remaining triodes being connected over resistors, as 417, of 2.2 megohms to various ones of the digit-representing conductors in a pattern which is clearly shown in Fig. 2.

Depending upon whether the trigger pairs are "on" or "off," the anode potentials of their left and right triodes will be either at almost +200 volts or at a much lower potential as a result of the drop across the anode resistors of the conducting triodes. The pattern of resistance network connections, as shown in Fig. 2, is so arranged that, for any digit represented by the combination of "on" and "off" conditions of the cascaded trigger pairs, the conductor corresponding to that digit will have a potential which is less positive than that of any other digit-representing conductor and will thereby manifest the digit standing in that order of the accumulator.

If desired, the potentials of the digit-representing conductors can be sensed and can control an apparatus for positioning a digit-bearing wheel with the digit in reading position which corresponds to the conductor having the least positive potential. One such mechanism for accomplishing this result is shown in my co-pending application Serial No. 133,540, which was filed on December 17, 1949.

In a similar manner, digits represented by the "on" and "off" conditions in other denominational orders can be made apparent.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In an apparatus of the class described, the combination of a multi-denominational order accumulator including denominational accumulating elements and tens transfer means coupling adjacent accumulating elements, the transfer means between each pair of adjacent elements including a device operated from a normal condition by its related lower order element to indicate a tens transfer requirement each time the lower order element exceeds its capacity and operable to cause an entry of a unit in the next higher element when the device is returned to normal condition; means normally operating to supply a succession of restoring impulses to all the transfer means to restore any operated device of the transfer means to its normal condition to cause tens transfer and transfer-on-transfer entries to be made; means to enter selected digits into the accumulator; and means operated by the entering means for disabling the normally operating means during amount-entering operations to prevent restoring impulses from being supplied to the tens transfer means to prevent transfer entries from occurring during amount-entering operations; said normally operating means being operable between amount entries to cause one or more tens transfer entries to occur in succession, as required, between amount entries, whereby transfer-on-transfer entries may be made in the accumulator.

2. In an apparatus of the class described, the combination of a plurality of banks of electronic devices, each bank constituting a denominational order of an accumulator; circuits interconnecting the devices of a bank to cause their operation to accumulate amounts; means to enter any selected digits into said banks; tens transfer means coupling adjacent banks, the means between each pair of adjacent banks including an electronic device operable from normal condition to indicate a tens transfer requirement and operable when restored to normal condition to effect an entry of a "unit" in the next higher order adjacent bank; said transfer means including means coupling each lower order bank to its related electronic device of the transfer means to enable the bank to operate the device from normal condition each time the bank exceeds its capacity and including means coupling each electronic device of the transfer means to the next higher adjacent order to enable transfer entries to be made therein; normally operating tens-transfer-effecting impulse generating means coupled to the electronic devices of the transfer means of all the banks for emitting a succession of impulses for restoring any operated device to normal to cause tens transfer and transfer-on-transfer entries to be made; and means controlled by the digit-entering means for rendering the normally operating tens-transfer-effecting means inoperable during a digit-entering operation.

3. In an apparatus of the class described, the combination of a plurality of banks of electronic devices, each bank constituting a denominational order of an accumulator; circuits interconnecting the devices of a bank to cause their operation to accumulate amounts and to generate an impulse each time the bank exceeds its capacity; means to enter any selected digits into said banks; tens transfer means between adjacent banks, the means between each pair of adjacent banks including a pair of electron discharge tubes connected as a trigger pair and operable from normal condition to indicate a tens transfer requirement and operable when restored to normal condition to generate an impulse which can cause an entry of a "unit" in the higher order adjacent bank; means coupling each lower order bank to the trigger pair related to that bank to enable the impulse, which is generated by the bank, to operate the trigger pair from normal condition each time the bank exceeds its capacity; means coupling the trigger pairs to their next adjacent higher orders to enable the impulse generated thereby to cause an entry of a "unit" therein; normally operating tens-transfer-effecting impulse-generating means coupled to all the trigger pairs and applying a succession of impulses thereto to restore any operated trigger pair to normal to cause tens transfer and transfer-on-transfer entries to be made; and means controlled by the digit-entering means for disabling the normally operating tens-transfer-effecting impulse-generating means during a digit-entering operation.

4. In an apparatus of the class described, the combination of a plurality of banks of electronic devices, each bank constituting a denominational order of an accumulator; circuits interconnecting the devices of a bank to cause their operation to accumulate amounts and to generate an impulse each time the bank exceeds its capacity; means to enter any selected digits into said banks; tens transfer means between adjacent banks, the means between each pair of adjacent banks including a pair of electron discharge tubes connected as a trigger pair and operable from normal condition to indicate a tens transfer requirement and operable when restored to normal condition to generate an impulse which is operable to effect an entry of a "unit" in the higher order adjacent bank; means coupling each lower order bank to the trigger pair related to that bank to enable the impulse which is generated by the bank to operate the trigger pair from normal condition each time the bank exceeds its capacity; means coupling the trigger pairs to their next adjacent higher orders to enable the impulses generated thereby to cause an entry of a "unit" therein; tens-transfer-effecting impulse-generating means normally operating to generate a succession of impulses and coupled to the trigger pairs for applying these impulses thereto to restore any operated trigger pair to normal to cause required tens transfer entries to be made; and means controlled by the digit-entering means for preventing the tens-transfer-effecting impulse-generating means from generating impulses during a digit-entering operation; the first impulse which is generated by the tens-transfer-effecting impulse-generating means after the digit-entering operation causing the entry of all transfers which were required during the entering operation, and succeeding impulses causing any transfers, which result from transfer entries, to be made, whereby transfer-on-transfer entries can be effected in the several banks as required.

5. In an apparatus of the class described, the combination of a plurality of banks of electronic devices, each bank constituting a denominational order of an accumulator; circuits interconnecting the devices of a bank to cause their operation step by step in response to impulses to accumulate amounts and to generate an impulse each time the bank exceeds its capacity; means to enter any selected digits into said banks; tens transfer means between adjacent banks, the means between each pair of adjacent banks including a pair of electron discharge tubes connected as a trigger pair and operable from normal condition to indicate a tens transfer requirement and operable when restored to normal condition to generate an impulse which is operable to effect an entry of a "unit" in the higher order adjacent bank; means coupling each lower order bank to one of the tubes of the trigger pair related to that bank to enable the impulse which is generated by the bank to operate the trigger pair from normal condition each time the bank exceeds its capacity; means coupling the trigger pairs to their next adjacent higher orders to enable the impulses generated thereby to cause an entry of a "unit" therein; oscillator-driven tens-transfer-effecting-impulse-generating means normally operating repeatedly to generate successive impulses and coupled to the other tubes of all the trigger pairs for applying these impulses thereto to restore any operated trigger pair to normal to cause required tens transfer entries to be made; and means controlled by the digit-entering means for preventing the tens-transfer-effecting-impulse-generating means from applying impulses to said other tubes of the trigger pairs during a digit-entering operation.

6. In a multi-denominational-order accumulator in which each denominational order contains a counting unit made up of four cascaded trigger pairs interconnected to count and represent digits "0" to "9" by combinations of "on" and "off" conditions of the trigger pairs, the combination of transfer means coupling the several denominational orders and including, for each order, a pair of tubes interconnected to operate as a trigger pair having two stable operating conditions; means connecting one tube of each transfer trigger pair to one of the counting trigger pairs of a related order to be operated from a normal condition to indicate a tens transfer requirement when that order counting unit passes from a representation of "9" to "0"; impulse-generating means connected to the other tube of each of the transfer trigger pairs for normally supplying a succession of impulses to said other tube of the transfer trigger pairs to restore the transfer trigger pairs to a normal condition if they had been operated from normal condition during an amount-entering operation or as a result of a transfer-on-transfer operation; means connecting each transfer trigger pair to the next higher order to enable an impulse to be transmitted to said next higher order from said transfer trigger pair as it is restored to normal condition, whereby to cause a unit to be entered in said next higher order; and means controlled by an amount-entering means for preventing the impulse-generating means from sending impulses to the transfer means while an amount is being entered into the accumulator.

7. A device as claimed in claim 6 and, in addition thereto, reset means for controlling the cascaded trigger pairs to turn all these trigger pairs to their "off" condition to represent "0" and controlling the transfer trigger pair to prevent this trigger pair from being operated by said one of the cascaded trigger pairs in a resetting operation.

CARL F. RENCH.

REFERENCES CITED

The following references are of record in the file of this patent:

UNITED STATES PATENTS

| Number | Name | Date |
|---|---|---|
| 1,767,674 | Horton | June 24, 1930 |
| 2,041,977 | Sundstrand | May 26, 1936 |
| 2,349,810 | Cook | May 30, 1944 |
| 2,384,379 | Ingram | Sept. 4, 1945 |
| 2,402,988 | Dickinson | July 2, 1946 |
| 2,442,428 | Mumma | June 1, 1948 |
| 2,484,115 | Palmer et al. | Oct. 11, 1949 |
| 2,490,500 | Young | Dec. 6, 1949 |
| 2,502,360 | Williams | Mar. 28, 1950 |

OTHER REFERENCES

"A Four Tube Counter Decade," Potter, Electronics, June 1944, pp. 110–113.

"Electronic Counters," Grosdoff, RCA Review, September 1946, vol. II, No. 13.